United States Patent [19]
Lewis et al.

[11] Patent Number: 5,510,659
[45] Date of Patent: Apr. 23, 1996

[54] ELECTROLYSIS INHIBITING MARINE ENERGY MANAGEMENT SYSTEM

[76] Inventors: David C. Lewis, 840 First St., Hermosa Beach, Calif. 90255; Jonathan M. Lewis, 115 S. Guadalupe #B, Redondo Beach, Calif. 90277

[21] Appl. No.: 181,185

[22] Filed: Jan. 13, 1994

[51] Int. Cl.⁶ ............................................. H02J 3/14
[52] U.S. Cl. .................. 307/11; 307/10.7; 307/64; 320/43; 320/44
[58] Field of Search .................... 307/10.7, 64, 66, 307/85–87, 11, 95; 320/43, 44; 361/139, 154, 160, 170

[56] References Cited

U.S. PATENT DOCUMENTS

| | | | |
|---|---|---|---|
| 3,661,742 | 5/1972 | Osborn et al. | 204/147 |
| 3,826,954 | 7/1974 | Neher | 317/135 |
| 3,929,606 | 12/1975 | Wood | 204/196 |
| 3,930,977 | 1/1976 | Wood | 204/196 |
| 4,090,088 | 5/1978 | McMahon et al. | 307/38 |
| 4,456,869 | 6/1984 | Schub | 320/38 |
| 4,929,931 | 5/1990 | McCuen | 340/636 |
| 4,998,024 | 3/1991 | Kirk et al. | 307/40 |
| 5,055,702 | 10/1991 | Bhattacharya | 307/29 |
| 5,343,137 | 8/1994 | Kitaoka et al. | 320/13 |

*Primary Examiner*—William M. Shoop, Jr.
*Assistant Examiner*—Albert Paladini
*Attorney, Agent, or Firm*—Ronald M. Goldman

[57] ABSTRACT

Supply of ac current from the marina source to the boat's DC loads is permitted only when an isolation relay completes the electrical circuit therebetween. A control means monitor the boats battery voltage, battery charger current and DC load current, and supplies operating current to the isolation relay only when those monitored conditions indicate a need for the supply of current from the on-shore source to the boat. The duration in which the on-shore ground lead is connected to the boat's ground system, a customary path for electrolysis currents, and corrosion damage caused by those currents, and the duration of consumption of on-shore electricity, are thus limited.

13 Claims, 3 Drawing Sheets

Fig_1

Fig_2

Fig. 3

Fig_4

5,510,659

ELECTROLYSIS INHIBITING MARINE ENERGY MANAGEMENT SYSTEM

FIELD OF THE INVENTION

This invention relates to a marine electrical energy management systems for boat marinas and, more particularly, to a power management system for controlling distribution of single phase A.C. power from the marina to docked boats to limit the duration of any corrosion producing electrolysis currents caused by incorrect boat wiring and reduce the demand for marina electrical power.

BACKGROUND

Modern boat marinas provide slips for docking large numbers of watercraft, vessels or boats, as variously termed. Since most boats are equipped with modern electrical equipment and batteries, marina facilities typically include dock side electrical outlets at each slip. Electrical energy, typically 115 volt 60 Hz A.C. current, is supplied to that outlet over an onshore three wire type electrical distribution system. The electrical lines of that distribution system extend along the dock and connect to the slip outlets.

By plugging the onboard electrical distribution system into the slip's associated electrical outlet the boater makes an electrical connection to the marina's onshore electrical system. The electricity from that source is used to operate the various on-board electrical equipment, a principal one of which is the battery charger. The battery charger converts the supplied AC current to the direct current form, DC, and supplies the DC current to charge the boat's DC batteries. Using electrical power supplied from onshore avoids the need to continuously run the boat's gasoline or diesel engines or gasoline operated motor generators to generate that electricity while the boat is docked. Typically those fuel operated generators produce electricity at a lower efficiency than the electric company.

Many boats thus share the same onshore electrical distribution system. That communal use, however, has an undesirable adverse effect. Despite cautions and warnings to boat owners, among the large numbers of boats docked at the marina, one typically finds at least one boat with an onboard electrical system that is incorrectly wired, typically with incorrect neutral and ground polarities, creating a voltage difference between the boat's metal fittings and the surrounding water. Sometimes the marina's electrical outlet at an individual boat slip is incorrectly wired causing the same effect in the docked boat. As a consequence some electrical current propagates through the boats metal through-hull fittings, which are included in the boats electrical ground system, into the water, creating an undesired electrolysis current that corrodes metal parts. Adjacent boats, sharing the same onshore power system, complete the electrical circuit for this undesired current via the ground path that is included in all AC power systems, including the onshore electrical system. Since the onboard electrical equipment in the offending boat appears to the boat owner to be functioning normally, that undesired current goes unnoticed.

Salt water provides a low impedance electrical path, typically on the order of 0.6 ohms per foot. Although the magnitude of the electrolysis current is low, typically on the order of milliamps, a one milliamp current flowing through a through-hull fitting for a period of one year produces sufficient corrosion damage to the boat's fittings as may cause premature failure and require the fitting to be replaced. Expensive metal propellers are also affected in that way. The electrolysis current slowly, but surely, eats the metal parts away. Not only does the undesired electrolysis current cause damage on the offending boat responsible for the problem, damage also occurs to the adjacent boats innocently found within the path of that electrolysis current. In practice pleasure boats are often docked and left unattended for long periods, greater than the time spent at sea. It is not unusual for a sailor to return to his boat after a long absence and find the propeller inexplicably corroded away.

The problem is best solved by ensuring that the dock's electrical outlets are correctly wired and that vessel's electrical system is properly wired and modified only by trained personnel, initially, and, thereafter, for the vessel's electrical system to be checked from time to time to ensure continued compliance. In reality that solution is never achieved in practice.

Another way to avoid creating electrolysis currents under such circumstances is to simply disconnect the ground path. However that action results in an unacceptable fire and electrical shock hazard onboard the vessel. Another partial solution is to leave the vessel disconnected from the onshore source. However, most maritime vessels have built in electrically operated safety equipment, such as automatic bilge pumps. The power source for that safety equipment is the vessel's batteries, which have only a limited storage capacity. When a vessel is docked for long periods, shore power is required to maintain a level of charge in those batteries sufficient to operate that safety equipment. Simply disconnecting the vessel from shore power for long periods of time, allowing the battery to discharge, thus, produces an unacceptable safety hazard.

The present invention advantageously provides a solution to the electrolysis current problem. The electrolysis damage experienced by a boat under such circumstances is directly related to the amount of time the boat is connected to the onshore power distribution system. The present invention automatically reduces the duration in which any boat's onboard electrical system is connected to the onshore distribution system, interrupting electrolysis current paths and minimizing potential corrosion damage. The invention does so without compromising electrical fire and shock hazard prevention requirements and does so without creating a safety hazard.

A principal object of the invention, thus, is to prevent corrosion damage to a boat's through-hull fittings by eliminating or minimizing the duration of electrolysis currents created due to incorrect onboard electrical wiring.

Another object of the invention is to minimize the duration of any water borne electrolysis currents created by incorrect wiring of a boat's onboard electrical systems as might adversely affect the boatowner's boat or that of a neighbor.

A further object of the invention is to provide a power management system of simple and inexpensive structure for controlling the connection between a boat's electrical distribution system and the marina's electrical distribution system to eliminate or reduce corrosion damage to the boat's through hull fittings.

A large percentage of the electrical power consumed by a docked boat is used to trickle charge the boat's batteries and maintain them at full charge, a long established maintenance practice. Despite acceptance of that maintenance practice, some adverse consequences are posed. Battery fluids continually boil off from the battery or vaporize, leaving behind salts and minerals in the battery. Those salts and minerals eventually degrade the battery and reduce battery life. Then too, with the marina continually supplying power for this purpose to a large number of boats, substantial electrical power is consumed, which is expensive and is even thought to be wasteful. On the average, it is estimated that a docked boat using such trickle charge practice receives charging current for approximately 8,000 hours during a twelve month period.

The present invention avoids that waste of the marina's electricity. As an ancillary advantage the present invention permits the boat's on-board electrical system to connect to the on-shore system for substantially shorter periods, avoiding deleterious consequences for the battery, while allowing the battery to remain essentially fully charged. With the present invention it is estimated that battery charging may occupy as few as one-hundred hours during a twelve month period.

An ancillary object of the invention, therefore, is to extend the operational life of a vessel's battery.

The present invention provides the boat owner a way of avoiding corrosion of expensive boat fittings and the like. While the boat owners savings alone would give the marina operators little incentive to encourage boat owners to employ the present invention, the ancillary advantage, which the invention offers, allowing marina owners savings in the cost of electricity, an overhead expense, directly benefits marina operators as well.

Accordingly, another ancillary object of the invention is to reduce the marina's electrical supply costs through reduction of the electrical consumption required by docked boats.

SUMMARY OF THE INVENTION

In accordance with the present invention, a marine power management system minimizes the amount of time that an unattended docked vessel is connected to on shore electrical power while maintaining the vessel in a safe state. In such system, an isolation switching mechanism, such as a relay or like breaker, has its switching contacts inserted in electrical series circuit between the vessel and the on-shore power system. Normally the switching mechanism is open, more specifically, the switching mechanism's switching contacts are open, to interrupt each of the electrical leads extending from the on-shore power source to the vessel, electrically isolating the vessel. The condition of the switching mechanism as being either open, isolating the two electrical systems from one another, or closed, that is, the switching contacts are closed completing the connection between the marina power system and that of the vessel, is determined by sensors that monitor at least the vessel's current consumption and battery charge status and a control logic module that interprets such sensors and appropriately configures the isolation switching mechanism, either on or off.

When the power consumption is low and the batteries are fully charged, the switching mechanism is placed in the normal disconnected open state; otherwise such mechanism is automatically connected or closed. With the switching mechanism in its disconnected state, the vessels electrical demands are satisfied solely by the on board battery. The switching mechanism is closed, reconnecting the vessel's electrical system to the on-shore power system, if either the electrical power demands of the vessel increase above a predetermined acceptable level, whereby those excess demands are satisfied by the on-shore power source, or the battery charge state drops below an acceptable level, as may happen over long periods of low power demand, whereby the battery may be recharged from the on-shore power source.

In alternative embodiments additional criteria may also be employed. One such approach is to routinely have the switching mechanism close for a predetermined period on a prescribed periodic basis to allow the on-shore system to provide charging current for the battery for a predetermined duration.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF A PREFERRED EMBODIMENT

Figure 1:
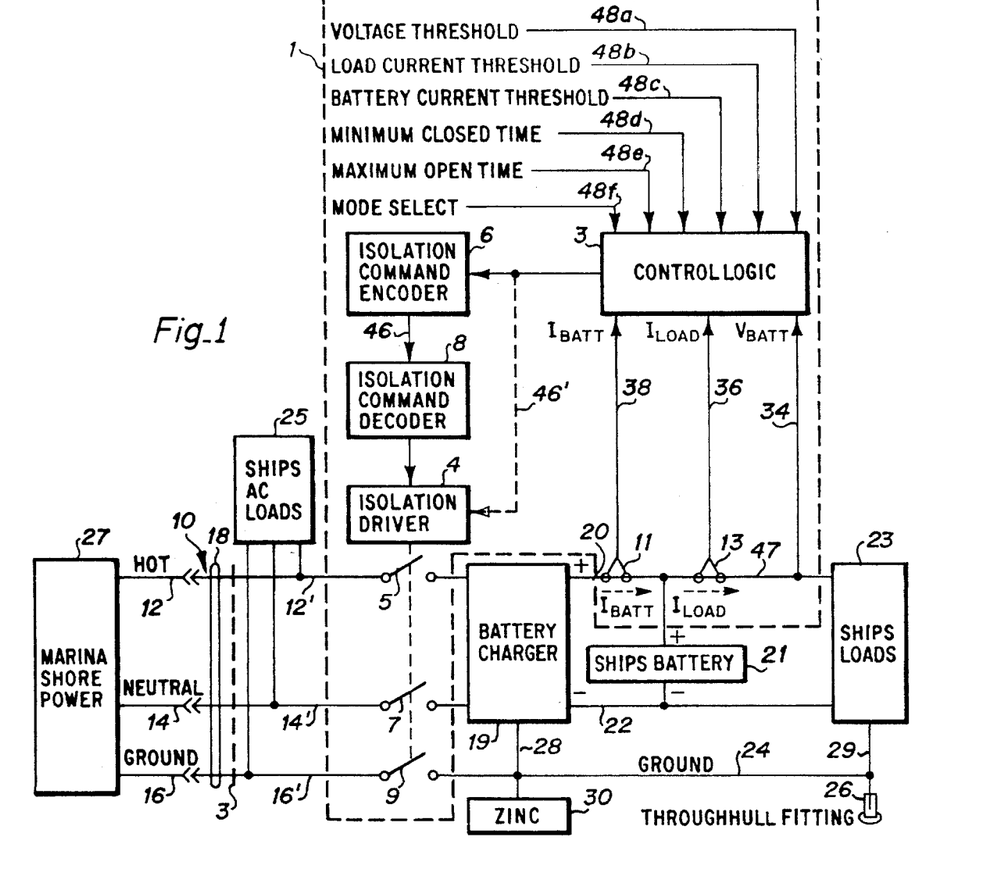
FIG. 1 shows the preferred embodiment of the invention in schematic diagram form.

A preferred embodiment of the invention is presented in FIG. 1 to which reference is made. The power management circuit is bordered in dash lines 1 and includes a control logic module 3, isolation switching mechanism 4, isolation switching elements 5, 7, and 9, of the normally open type, wireless communications devices, such as encoder 6, connected to control logic module 3, and decoder 8, connected over wireless broadcast path 46, or, alternatively, a direct wire connection, as represented by dash line 46', from control logic module 3 to the isolation and switch mechanism 4, a battery charger current sensor 11, and load current sensor 13. The isolation mechanism is preferably an electromagnetic type relay that contains relay contacts which are sealed to protect the contacts from the external salt water atmosphere, although equivalent solid state semiconductor switches may be substituted for the electromechanical device. For completeness, the foregoing power management system is illustrated installed in a complete electrical system that includes a boat's customary electrical equipment, such as a battery charger 19, battery 21, the DC driven electrical loads 23, and the AC loads 25, and also includes the on-shore electrical AC supply system, including the marina's AC electrical supply 27 and the particular boat slip's electrical outlet 10.

Figure 3:
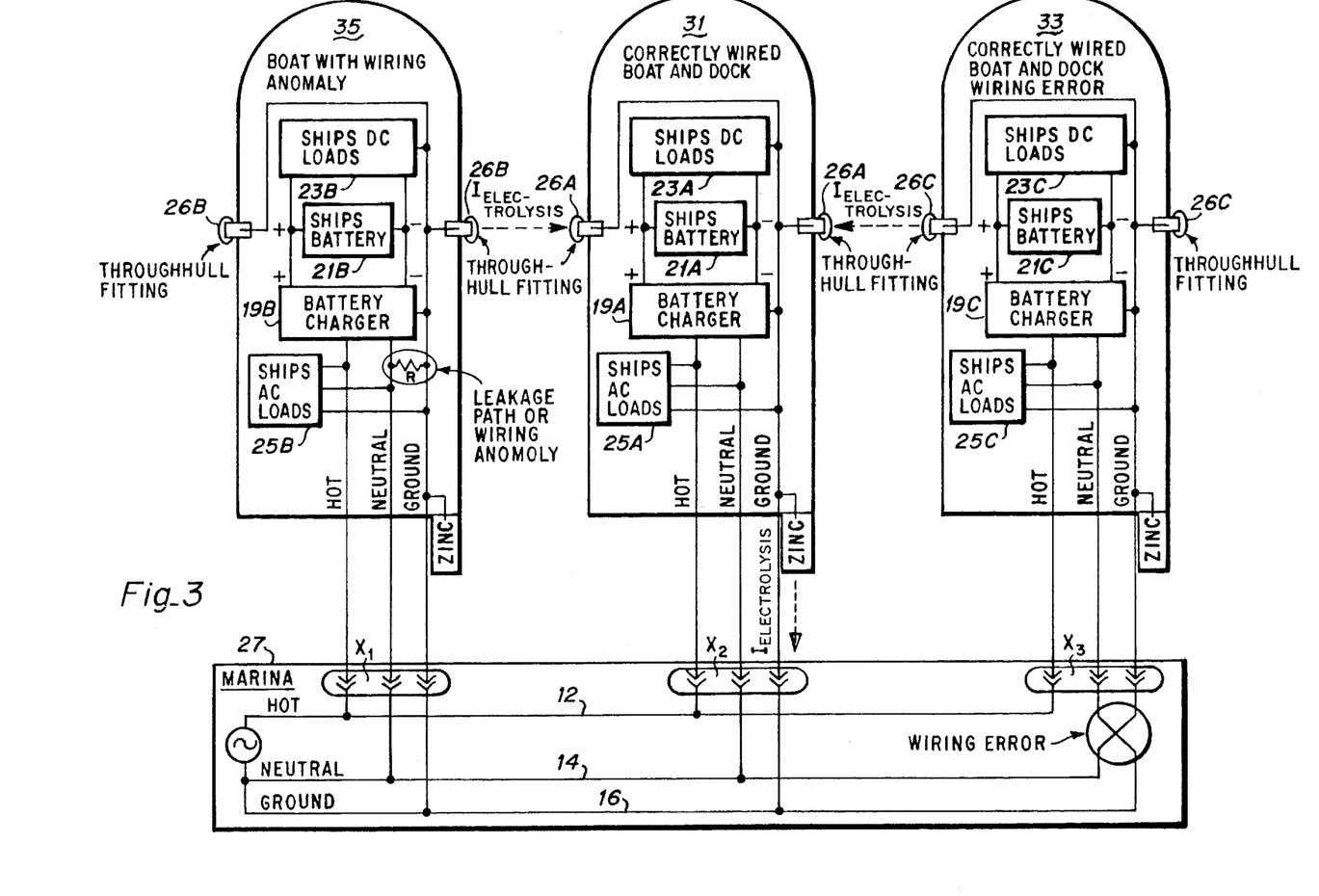
FIG. 3 schematically illustrates a marina power system with a number of docked boats and the effect of incorrect on-board wiring and incorrect dock wiring that produces an electrolysis current path through the marina power system ground.

It is noted that the on-board electrical system illustrated in FIG. 1 is correctly wired in accordance with manufacturer's recommendations. An incorrectly wired system is illustrated in FIG. 3 and is discussed later in this specification in connection with the operation of the invention.

As is evident from FIG. 1, the power management system is readily connected in circuit with the boat's existing electrical apparatus. It may be manufactured as a discrete separate module for later installation in the boat and connection to the on-board electrical system as illustrated, or integrated into other equipment, such as a battery charger, or is implanted partially on board the boat, for the logic functions, and partially on the marina for the power isolation function.

Single phase 115 volt alternating current, AC, is supplied by the marina to the slip over a three wire system, containing extending electrical leads, namely a hot line 12, containing the 115 volts, a neutral line 14 and a ground line 16. Those leads are connected through to an electrical outlet 10 from which the electricity is further distributed. A corresponding three wire electrical cord 18, connected to outlet 10, extends that electricity onto the boat, illustrated to the right of dash line 2. The corresponding three electrical leads in the cord, 12', 14' and 16', are connected through to the boat's uninterruptable type AC electrical loads 25, if any such loads are installed on the boat. Those uninterruptable loads are electrical apparatus that are intended to have access to AC at all times so that such load may be supplied with AC power, when required, under the direction of sensor apparatus associated with such loads, not illustrated, allowing that load to function normally. Being of conventional structure, load 25 need not be further described. Electrical leads 12', 14' and 16', also extend to normally open isolation switching elements 5, 7 and 9, respectively, in the power management system illustrated in the block defined by dash lines 1.

The inputs to battery charger 19 are connected to the other contacts of isolation switching elements 5 and 7, and the remaining isolation switching element 9 is connected to the boat's ground system, represented by lead 24 in the figure. In turn the positive polarity output of the battery charger is connected over line 20, via battery charger current sensor 11 to the positive polarity terminal of ship's battery 21; the return current path from the negative polarity terminal of the battery to that of the charger is provided by lead 22.

So long as battery 21 contains an electrical charge, current from the battery is supplied, as needed, over lead 47 to the boats DC driven electrical loads, represented collectively by block 23, and the return current from load 23 is over lead 22 back to the battery. Such DC driven loads consume electrical power as dictated by sensor apparatus associated with such loads, not illustrated, and, being of conventional structure, are not further described. Accordingly, such loads function normally as needed, so long as battery 21 maintains sufficient electrical charge. The on-board electrical loads are entirely conventional in structure, actuation and operation. Since exact structure of those known on-board electrical loads are not important to the present invention, it need not be further described.

As is the customary practice the battery charger casing and the DC loads casings, which are formed of electrically conductive metal, are also respectively connected to the on-board electrical ground system, as represented by leads 28 and 29 in the figure connected to the boats ground lead 24. Ground lead 24 also connects to the boats metal through-hull fittings 26 and zinc plates, 30, which are electrically conductive.

As is known Zinc plates are conventionally applied to boats as a protective measure intended to inhibit electrolysis corrosion of the through hull fittings and the like. In contact with the water outside the boat, particularly salt water, a slight potential difference is created between the zinc and the other metals on the boat to which the zinc is electrically connected, creating a reverse current that is intended to counteract the other electrolysis current addressed by the present invention, the protective system effectively acting like a small electrical battery. The zinc plate is eventually consumed in the process and requires replacement, but replacement of that element is a small expense compared to the fittings that such protective system is intended to protect. However that protective measure is found insufficient to provide the protection against electrolysis currents generated through the boat marina, and leaves one with the electrolysis problem that the present invention addresses. For all practical purposes of the present invention, the protective effect of the zinc plate technique is negligible and need not be discussed further. The through-hull fittings are also in direct contact with the water outside the boat, the significance of which is later herein described.

Each of battery charger current sensor 11 and load current sensor 13 are known devices that are commercially available. To install the power control unit, battery charger current sensor 11 is connected in series with lead 20 at a position between the battery charger's positive polarity output and the battery and the sensor's output is connected over lead 38 to an input of the control logic and driver module 3. Load current sensor 13 is connected in series circuit with lead 47 at a position between the battery and electrical load 23 and that sensor's output is supplied via lead 36 to the load current input of the logic module. Control logic module 3 contains appropriate circuitry to monitor the voltage of battery 21 and, hence, the $V_{BATT}$ input of module 3 is connected by lead 34, to monitor that voltage, at lead 47.

Control logic module 3 is formed of decisional logic circuits, which are conventional in structure typically formed of semiconductor devices of known structure, and electronic voltage and current sensing devices and preferably include a programmable electronic clock. The module contains various input settings that may be set by the operator including, the voltage threshold, the load current threshold, the battery current threshold, the maximum "open" interval for switch mechanism 4 and the minimum "closed" time for isolation switch mechanism 4, and an automatic or manual mode select, which are illustrated in the figure. The module is powered by DC from the ship's battery taken from input 34.

In operation, control logic module 3 is provided with appropriate operational information. Battery charger current sensor 11 monitors the level of DC current supplied by the battery charger over lead 20, which is the current supplied by the charger to battery 21 and to load 23, should the latter be drawing current, and supplies an electrical signal representative of the level of current sensed to input lead 38 of control logic and relay driver module 3. The load current sensor 13 monitors the level of DC current supplied to load 23 over lead 47 and supplies an electrical signal, representative of the level sensed, to input lead 36 of control logic module 3. The DC voltage level across battery 21, which is an indirect measure of the batteries charge level, is sensed over lead 34. Assuming initially that the battery 21 is fully charged and the electrical load 23 is not drawing current, isolation elements 5, 7 and 9 are placed in the open state.

Figure 2:
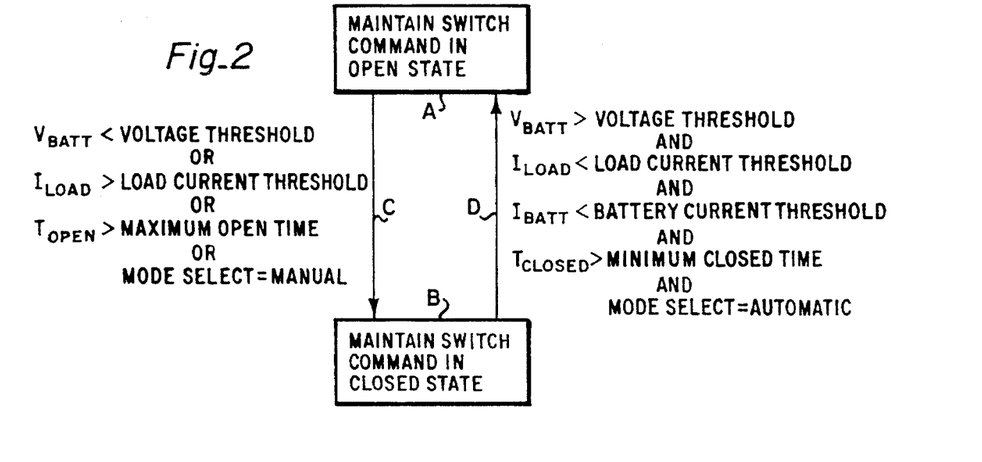
FIG. 2 is a state transition diagram describing the command logic for determining the state of the switching mechanism used in the embodiment of FIG. 1.

The decisional logic implemented by control logic module 3 is presented in the state transition diagram of FIG. 2. FIG. 2 describes the monitoring and control functions carried out by control logic module 3. It represents the state of the logic modules output and that of the isolation switch 4 and the events that occur to change the isolation switching mechanism from the open to the closed condition; and vice-versa. Thus if the isolation switching mechanism 4 is in the open state, as represented at block A, any of the conditions presented to the left causes module 3 in the preceding figure, to change its state, as represented by the line C, to the closed state, represented by block B. Similarly with the isolation switching mechanism in the closed state as represented by block B, any of the conditions on the fight in the figure results in the transition, represented by the line D, of that switching mechanism to the open state as at block A.

Should any of the vessel's electrical loads, such as the bilge pump, become active, electricity is drawn from the batteries. If the load current sensed by sensor 13, under such circumstances, exceeds a fixed threshold as determined by module 3 then Logic module 3 supplies appropriate output to isolation command encoder 6, which encodes and broadcasts that output information to receiver decoder 8. In turn the decoder provides the output to operate isolation switch mechanism driver 4, which closes its isolation elements 5, 7 and 9, connecting the on-shore electrical source to the on-board electrical system, including connecting ground lead 16 to the ground system on the vessel. It may be noted that in the alternate embodiment the output current from logic module 3 is directly applied via lead 46' to the isolation switch mechanism 4 to operate that mechanism.

With electrical power supplied, battery charger 19 activates and converts the AC input from the on-shore source to a DC voltage output and supplies DC current over lead 20 to battery 21, with the DC polarity being as indicated in the figure, and over lead 47 to load 23. After the vessel's loads become inactive, the battery charger nonetheless continues to supply charging current to the battery, and that charging current continues, monitored by sensor 11 as $I_{Batt}$, until the current falls to the threshold level, and the battery, thereby, attains a full charge.

And should the battery charge state fall below a fixed threshold, as indicated by the battery voltage, $V_{Batt}$, sensed by module 3, the module supplies current to isolation driver 4 and causing the driver to operate and close isolation elements 5, 7 and 9, thereby permitting current from the on-shore source to power the battery charger 19. The charger in turn provides a DC output to recharge battery 21 until the charger current falls to the appropriate level as sensed by control module 3 at $I_{Batt}$.

Essentially once module 3 causes isolation driver 4 to connect to the on-shore electrical source in response to a sensed condition and that sensed condition changes to a normal one, the module essentially checks the remaining sensors to insure that none of the other sensors indicate an active state that requires isolation elements 5, 7 and 9 to remain closed. If those other sensors are found to be supplying normal indicating outputs, only then does the module terminate current to isolation driver 4, permitting isolation elements 5, 7 and 9 to revert to the open condition, disconnecting the vessels on-board distribution system, including ground, from the on-shore electrical source.

A summary of the decisional steps taken by control logic module 3 are given. In this in order to transition from the closed state to the open state, all of the specified conditions must be satisfied simultaneously, a Logical AND. In order to transition from the open state to the closed state any one of the specified conditions will suffice, a Logical OR.

| Present state of Isolation Switch Elements 5, 7 & 9 | Condition | Next state of Isolation Switch Elements 5, 7 & 9 |
|---|---|---|
| CLOSED | $V_{Batt}$ > Voltage Threshold; AND $I_{load}$ < Load Current Threshold; AND $I_{Batt}$ < Battery Current Threshold; AND $T_{Closed}$ > Minimum Closed Time; AND Mode Select = Automatic | OPEN |
| OPEN | $V_{Batt}$ < Voltage Threshold; OR $I_{load}$ > Load Current Threshold; OR $T_{Open}$ > Maximum Open Time; OR Mode Select = Manual | CLOSED |

In some circumstances it is desirable to distribute the power control system such that the power isolation switching elements 4, 5, 7 and 9 and isolation command decoder 8 are permanently installed as part of the marina, not on the boat, with the logic and sensing functions remaining a permanent installation on the boat. That reorganization is possible and is the reason for including the isolation command encoder 6 and isolation command decoder 8 within the system in lieu of a direct connection. These elements interface through interconnect wireless transmission path 46, the form of which can be optical, electromagnetic, radio wave or water borne sonic and which in each case is known practice and, hence, may be physically separated.

Although it is possible in such alternative embodiment to extend any additional cable from control logic module 3 to the switching mechanism 4 and its contacts, if the latter is located on shore, such as by extending lead 46; an additional electrical lead is undesirable. The more modern "wireless" form of transmission from module 3 is preferred. Another alternative interface option, a hybrid of one of the foregoing, would be to use the ground return line 16 as the signal carrier for a digital encoded control signal, similarly, a known practice. All of the foregoing variations, it is appreciated, are part of the present invention.

The preferred embodiment incorporates a control logic module 3 containing dedicated logic circuits. As those skilled in the art appreciate other forms of monitoring and switching circuits may be substituted to perform the described functions within control logic module 3. The module may instead incorporate a computer, containing a programmed read only memory, or, alternatively still, a programmed general purpose computer as a substitute to make the described status checks and decisions.

As example, with a programmed digital processor type apparatus in lieu of the logic circuits, the processor, under control of a program, suitably contained in a read only memory associated with the processor, repetitively checks each of the sensor inputs, either, directly, by testing each input or, indirectly, by reading the sensor information into temporary memory and then checking that information. If one of those inputs is above normal, as earlier described, the computer would output the drive current to operate the isolation relay. As the computer would continuously check the inputs as soon as the computer determines that the input which initiated the operation of the isolation relay was back to normal it would enter a timing sequence to ensure that the normal signal is not simply transient. Once the computer confirms that such input is back to normal, it then checks each of the other inputs, any of which could separately have initiated the operation of the isolation relay 4 in the manner first described for the first input, to determine whether those additional inputs also give normal readings. If so, the computer terminates the drive signal to the isolation relay and the latter restores to an open state; if not, the drive signal to the relay is continued. The sequence then repeats.

For large volume production, a programmed digital processor is preferred. However in the logic circuit described in the preferred embodiment has substantial cost advantage for the limited volumes associated with initial production and is, hence, preferred.

The foregoing apparatus and operation may be considered in the context of existing boat and dock practices that give rise to electrolysis currents. FIG. 3 illustrates diagrammatically three boats 31, 33, and 35, docked adjacent one another at a marina 27. The figure illustrates the problem referred to earlier in this specification, which the present invention minimizes or solves. The electrical system in boat 31 is correctly wired; those in boats 33 and 35 are not. Boat 31 includes the battery charger 19a, battery 21a, DC operated electrical load 23a, and ac electrical load 25a and the respective hot, neutral and ground leads are connected to the corresponding leads 12, 14 and 16 of the marina's electrical system.

The corresponding on-board equipment is found within boat 33, including battery charger 19c, battery 21c, DC load 23c and ac load 25c with the respective hot, neutral and ground leads are connected to the corresponding leads 12, 14 and 16 of the marina's electrical system. However the shore power connection between the boat and the marina shore power source contains a polarity reversal in that the boat "neutral" input wire is incorrectly connected to the shore power ground terminal 16 and the boat "ground" is connected to the shore power neutral connection 14. This causes the correctly wired boat 33 to place the marina neutral power lead directly in contact with the surrounding water by means of through hull fitting 26C.

In all land based electrical power generation and distribution systems a small but measurable potential difference exists between the neutral and ground terminals of the power outlet. This potential difference is caused by asymmetric power loads on the distribution system and asymmetric resistance characteristics of the ground and neutral interface wiring. A direct consequence of boat 33's shore power polarity reversal is the application of the preexisting shore power potential difference between ground and neutral to through hull fitting 26A on boat 31 and through hull fitting 26C on boat 33 and resultant corrosion current. The magnitude of the current flow created by this potential difference will be in accordance with the well accepted ohms law, being controlled, among other things, by the previously cited resistivity of the interfacing water.

Disconnecting the boat 31 from the marina shore power will protect boat 31 from the wiring error on boat 33. However, other boats in near proximity to boat 33 will continue to suffer electrolysis damage even though those other boats are wired correctly in every respect as was boat 31. Thus a system that safely minimizes the time a boat is connected to shore power minimizes the potential for ground return current flow through metallic fittings and minimizes the associated electrolysis damage.

Corresponding equipment to boats 31 and 33 is found on boat 35, including battery charger 19B, battery 21B, DC load 23B with respective hot, neutral and ground leads connected to the corresponding leads 12, 14 and 16 of the marina's electrical system. The electrical systems or components contained within the boat are in a highly corrosive environment and such an environment can cause undesirable electrical conductivity paths. Of particular importance to this disclosure is the potential for undesired electrical conductivity between the neutral and ground shore power conductors, such conductivity being illustrated by the electrical resistance labelled R. The value of this resistance can range in value from hundreds of thousands of ohms down to zero ohms, or a short circuit induced by a basic wiring anomaly. No matter the cause, the consequence is identical to that described for the polarity reversal previously described for boat 33 in that a potential difference is created between through hull fitting 26B and then through any adjacent correctly wired boat, such as boat 31, through the latters hull fitting 26A. While this potential difference will be less than that previously described in the example given for boat 33, the electrolysis damage will be similarly deleterious.

A power management system in each of boats 31, 33 and 35, as represented in FIG. 3 temporarily opens the electrical connections to shore at block X1, with respect to boat 35, and block X2 with respect to boat 31 and block X3 with respect to boat 33. Hence, the electrical leads connecting the on-shore electrical system are isolated from the corresponding leads of the on-boat systems for great periods of time. That isolation disrupts and opens the described electrolysis current paths. Consequently the electrolysis current cannot flow and corrosion to the through hull fittings through the on-shore ground lead is avoided for those periods.

With the power management system installed on boat 35, which contains the faulty wiring, during the great periods of such isolation, there is no electrolysis current path to the on-shore electrical system. If prior to introduction of the present management system to boat 35, preexisting corrosion creates any resistance, such as R, in the ground path between the shore power ground and neutral connections, any electrolysis current passes only through the through hull fittings of that offending boat for substantially lower time periods, limiting corrosion damage to the offending boat. And with the power management system installed on boat 33, the effect of the marina's electrical wiring error is, likewise, minimized.

It is recognized also that the power management system responds to the electrical needs of the associated boat, extending the on-board electrical system to that of the marina only when needed and, optionally, at the sequential time period programmed on the optional electronic clock. Since the electrical needs of each boat are independent of one another, relative to one another, the connection to the on-shore supply is random. Since each of the three vessels illustrated in FIG. 3 have their electrical leads extended to the on-shore system on an independent basis, it would appear unlikely that any two of the craft would be connected to the on-shore system simultaneously and for the same duration of time. Simultaneous connection appears to be based entirely on chance or probability. As the number of boats docked at the marina increases to larger numbers, the probability increases that two of those boats will be simultaneously connected to the on-shore electrical lines and may overlap for some short period in drawing current over the on-shore lines. Thus in some instances the electrolysis current presented in FIG. 3 can be established, but that path is seen to exist for only a substantially reduced period of time.

The described power management system eliminates battery trickle charging thereby reducing the vessel's annual power consumption with consequent savings for the marina operator. Without trickle charging, battery fluid boil off is reduced and the battery life thereby extended. Since the vessel is disconnected from the on-shore power system for a majority of the time, the amount of electrolysis damage that can be experienced by a vessel subject to incorrect electrical wiring or that is docked near another vessel that has incorrect electrical wiring, directly related to the duration of the vessels connection to the on-shore electrical system, is minimized; perhaps to insignificant levels, inasmuch as the anticipated connection time will likely be reduced from approximately 8,000 hours to as little as 100 hours.

The present invention does not entirely eliminate electrolysis current; it reduces the period of time during which any such electrolysis current flows and thereby reduces the corrosion damage, which is functionally dependent on the duration of exposure and is cumulative. Thus while incorrect boat wiring continues and creates a potential for establishing electrolysis current to other boats, the present invention eliminates the persistence of that current to such an extent that electrolysis current damage should no longer be a serious concern for the boater.

Figure 4:
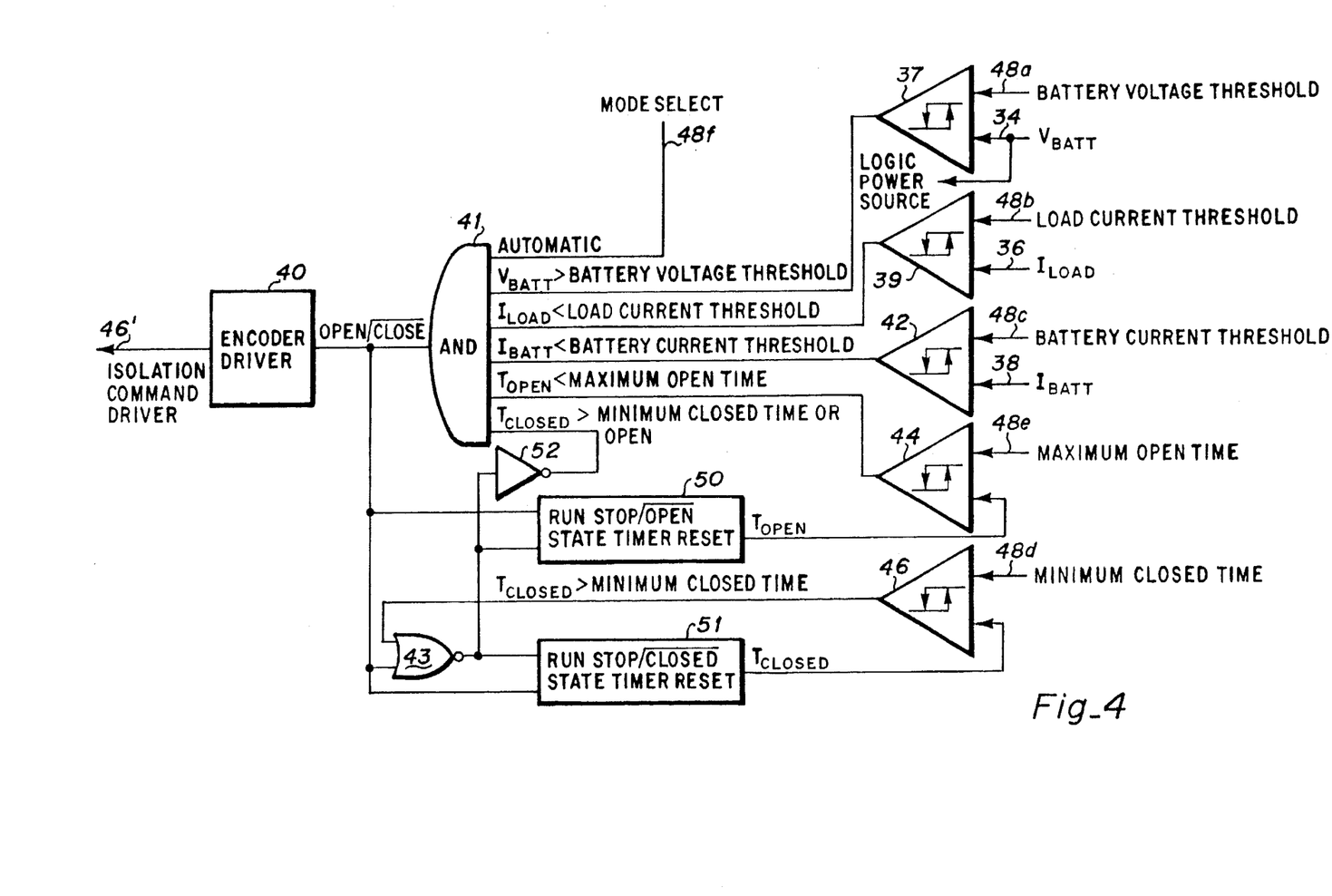
FIG. 4 is an example of logic circuitry as may be used in the invention of FIG. 1.

An example of a logic circuit as could be incorporated in the power control module is illustrated in block diagram form in FIG. 4. Semiconductor comparator switches 37, 39, 42 and 44 have outputs connected to inputs of an AND gate 41. Semiconductor comparator switches 46 has its outputs connected to one of the inputs of a NOR gate 43. The comparator is a known electronic digital switching device which maintains a low voltage at its output if the voltage level at one input is greater than the other; when equal or reversed in level the output switches to a high voltage.

Comparators 37, 39, and 42 have one of their respective inputs connected to an operator adjustable bias voltage, accessible to the operator at the front panel of the module, that represents a particular transition threshold and the second input connected to the associated sensor input. Comparator, 44 has one input connected to an adjustable transition threshold, an adjustment also accessible at the front panel, and the second input connected to the output of the "Open" state timer 50. Comparator, 46 has one input connected to an adjustable transition threshold, an adjustment that is accessible to the boat operator at the module's front panel, and the second input connected to the output of the "Closed" state timer 51. Comparator 37 will output a positive voltage when $V_{Batt}$ 34 is greater than the battery voltage threshold 48a. Comparator 39 will output a positive voltage when load 36 is less than the load current threshold 48b. Comparator 42 will output a positive voltage when $I_{Batt}$ 38 is less than the battery current threshold 48c. Comparator 44 will output a positive voltage when Topen is less than the maximum open time threshold 48e. Comparator 46 will output a positive voltage when $T_{Closed}$ is greater than the minimum closed time threshold 48d.

The NOR gate is a known electronic digital switching device which maintains a low voltage at its output if any of its inputs have a high voltage impressed upon them and maintains a high output voltage only when a low voltage is simultaneously impressed upon each input. The particular NOR gate used is a two input device with one of the inputs connected to comparator 46 and the second input connected to the output of the AND gate 41. The output of the NOR gate will have a high voltage only when $T_{Closed}$ is less than minimum closed time and the open/close command is in the closed state, as determined by AND Gate 41.

The Inverter gate 52 is a known electronic digital switching device which maintains a low voltage at its output when its inputs has a high voltage impressed upon it and maintains a high output voltage at its output when a low voltage is impressed upon its input. The input to the inverter gate 52 is connected to the output of the NOR gate 43. The output of the Inverter gate will have a high voltage when either $T_{Closed}$ is greater than minimum closed time or the open/close command is in the open state, as determined by AND Gate 41.

The AND gate is a known electronic digital switching device which maintains a low voltage at its output if any of its inputs have a low voltage impressed upon them and maintains a high output voltage only when a high voltage is simultaneously impressed upon each input. The particular AND gate used is a six input device with four of the inputs connected to comparators 37, 39, 42 and 44. The fifth input is connected to the mode select switch, available to the boat operator at the front panel of the module, which has a high voltage output when in the automatic mode and a low voltage output when in the manual mode. The sixth input is connected to the output of the inverter gate 52. When all six inputs are at a high voltage level, indicating that all of the criteria have been satisfied, the output of the AND gate produces a high voltage that causes the encoder driver 40 to issue an open command 46', causes the open state timer 50 to start measuring the elapsed time in the open state, and causes the closed state timer 51 to be reset to zero.

If any of the six inputs are at a low voltage level, indicating that a particular criterion is no longer satisfied, the output of the AND gate 41 produces a low voltage that causes the encoder driver 40 to issue a close command 46' and causes the open state timer 50 to stop, that is, hold its last value. Since the closed state timer 51 had been reset to zero in the previous open state, the criteria of $T_{Closed}$ greater than minimum closed time is false, and the output of the NOR gate is positive, causing the closed state timer 51 to start measuring the elapsed time in the closed state. After sufficient time in the closed state has elapsed, the output of comparator 46 changes to a high voltage which in turn causes the output of NOR gate 43 to change to a low voltage. When the output of NOR gate 43 changes to a low voltage, the closed state timer 51 stops, that is holds its last value, the open state timer 50 resets to zero and the output of the inverter gate 52 changes to a high voltage and once again enables AND gate 41. When all of the other criteria at the inputs to AND gate 41 are once again satisfied, the AND gate 41 causes encoder driver 40 to issue an open command and resets the closed state timer.

It may be noted that comparator switches have a built in hysteresis so that minor fluctuations or noise will not cause any repetitive changes of states or chatter. Hence if the voltage at one input rapidly fluctuates about a level equal to that at the reference input, the comparator does not recognize it since it requires the voltage differential to remain at or above the hysteresis level. The same effect occurs should the comparator be in its second state with the output at high and the instantaneous level of the DC input voltage temporarily fall below the level at which the comparator normally switches to its low output state. Additionally isolation switch mechanism 4 can be of the slow-to-release variety of electromagnetic relay, in which the switch mechanism contacts remain closed for a period of 50 to 100 milliseconds following termination of current to the relay coil. Should current be re-applied to the relay coil within that period, the relay continues to remain in its operated state. Hence the connection to the marina electrical supply may be insulated from transient changes in conditions sensed by the sensors.

It is believed that the foregoing description of the preferred embodiment of the invention is sufficient in detail to enable one skilled in the art to make and use the invention. However, it is expressly understood that the details of the elements which are presented for the foregoing enabling purpose are not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In a marine electrical power system for boats docked in water at a boat marina, said boat marina comprising:

an on-shore power distribution system associated with said boat marina for distributing a.c. electrical power from an on-shore source to a plurality of boat dock positions, said distribution being via a plurality of electrical leads extending dockside, said on-shore power distribution system comprising at least first and second a.c. power leads and a third ground lead; and at least one of said docked boats, including:

rechargeable D.C. battery means for storing charge of electricity and producing a predetermined voltage when fully charged, said battery including a first polarity terminal and a second polarity terminal;

an on-board a.c. electrical distribution system, said on-board a.c. electrical distribution system, including a first lead, second lead and a third ground lead;

means for connecting said on-board a.c. electrical distribution system in circuit with said on-shore a.c. electrical distribution system;

battery charger means, said battery charger means having an input for connection to said on-board a.c. electrical distribution system and an output connected to said battery means for providing D.C. current to said D.C. battery means, responsive to a.c. power supplied at said input, said battery charger means output including a first positive polarity terminal for connection to a positive polarity terminal of said D.C. battery means and a negative polarity terminal for connection to a negative polarity terminal of said battery means and a ground lead for connection to said third ground lead;

D.C. electrical distribution system connected to said battery means, said D.C. electrical distribution system including at least a first lead connected to a first polarity terminal of said battery and a second lead connected to the second polarity terminal of said battery, whereby said output of said battery charger means also supplies D.C. current to other electrical loads connected to said D.C. electrical distribution system;

stand-by electrical load device means coupled to said D.C. distribution system, said load device means being normally in a non-current consuming standby condition, and producing a demand for current only in response to a predetermined condition on said boat requiring said load device means to produce a predetermined action, wherein said load device means draws D.C. current from said D.C. distribution system; and a ground system, said ground system including at least some metallic fittings on said boat that extend to an external surface of the boat for contact with said dockside water; said ground system being connected to respective ground leads associated with each of said battery charger means and said electrical load device means;

the improvement therein of a electrolysis inhibiting power management system which comprises in combination therewith:

isolation switch means associated with said docked boat connected in electrical series circuit between said on-boat a.c. electrical distribution system and said battery charger means input and on-board ground system, said isolation switch means having a plurality of inputs connected to said respective electrical leads of said on-board a.c. distribution system and a plurality of outputs connected to the respective corresponding electrical leads of said D.C. battery charger means and said on-board ground system, said switch means having a first state for interrupting a current conducting path between the respective switch inputs and outputs and an alternate a second state for completing a current conducting path between those respective inputs and outputs; and control means associated with said docked boat for controlling operation of said isolation switch means, said control means for placing said isolation switch means in its second state, responsive to the occurrence of any of (a) a current demand by said stand-by electrical device means or (b) said battery voltage being below a predetermined minimum voltage level, whereby two of said a.c. electrical leads of said on-board a.c. distribution system are connected in operative relationship to said input of said battery charger means and said on-shore ground lead is connected to said ground system of said on-board D.C. distribution system and said battery charger means produces a D.C. current output, and for restoring said isolation switch means to its first state to thereby interrupt said connections to the on-boat a.c. distribution system and ground, responsive to at least (a) an absence of demand for current by said stand-by electrical device and said D.C. output current supplied by said battery charger means being below a predetermined minimum level for a predetermined period of time and (b) said battery voltage being at or above said predetermined level; whereby said ground from said on-shore a.c. distribution system is connected to said boat ground system only for limited intervals during the period of time in which the boat is docked at the marina to thereby limit the duration of any corrosion causing ground currents transversing a path from the boat ground system, through the dockside water to or through other docked boats, and said on-shore ground system.

2. The invention as defined in claim 1, wherein said control means further includes:

first sensor means for monitoring said battery voltage;

second sensor means for monitoring current produced by said charger means; and third sensor means for monitoring current drawn by said standby electrical device.

3. The invention as defined in claim 1, wherein said control means further comprises:

programmable clock means, said clock means for producing an output signal at a predetermined interval and maintaining that output for a predetermined duration;

said control means being responsive to said clock output signal for placing said isolation switch means in its second state for at least said predetermined duration.

4. The invention as defined in claim 1, further comprising:

remote control means intermediate said control means and said isolation switch means for providing transmission of control signals to said isolation switch means.

5. The invention as defined in claim 4 wherein said remote control means further comprises:

encoder transmitting means coupled to said control means for encoding control signals from said control means;

decoder receiving means coupled to said isolation switch means for receiving encoded control signals from said encoder means;

said encoder transmitting means providing a wireless transmission path to said decoder receiving means.

6. The invention as defined in claim 1, wherein said isolation switch means comprises:

an electromagnetic relay, said relay having an electromagnetic coil and at least three sets of normally open switching contacts, said contacts being switched to the closed condition responsive to application of current to said electromagnetic coil.

7. The invention as defined in claim 5, wherein said isolation switch means comprises:

an electromagnetic relay, said relay having an electromagnetic coil and at least three sets of normally open switching contacts, said contacts being switched to the closed condition responsive to application of current to said electromagnetic coil.

8. In a marine electrical power system for boats docked in water at a boat marina;

said marina comprising:

an on-shore power distribution system associated with said boat marina for distributing a.c. electrical power from an on-shore source to a plurality of boat dock positions, said distribution being via a plurality of electrical leads extending dockside, said on-shore power distribution system comprising at least first and second a.c. power leads and a third ground lead; and a plurality of said docked boats, each including:

rechargeable D.C. battery means for storing charge of electricity and producing a predetermined voltage when fully charged, said battery including a first polarity terminal and a second polarity terminal;

an on-board a.c. electrical distribution system, said on-board a.c. electrical distribution system, including a first lead, second lead and a third ground lead;

means for connecting said on-board a.c. electrical distribution system in circuit with said on-shore a.c. electrical distribution system;

battery charger means, said battery charger means having an input for connection to said on-board a.c. electrical distribution system and an output connected to said battery means for providing D.C. current to said D.C. battery means, responsive to a.c. power supplied at said input, said battery charger means output including a first positive polarity terminal for connection to a positive polarity terminal of said D.C. battery means and a negative polarity terminal for connection to a negative polarity terminal of said battery means and a ground lead for connection to said third ground lead;

D.C. electrical distribution system connected to said battery means, said D.C. electrical distribution system including at least a first lead connected to a first polarity terminal of said battery means and a second lead connected to the second polarity terminal of said battery means, whereby said output of said battery charger means also supplies D.C. current to other electrical loads connected to said D.C. electrical distribution system;

stand-by electrical load device means coupled to said D.C. distribution system, said load device means being normally in a non-current consuming standby condition, and producing a demand for current only in response to a predetermined condition on said boat requiring said load device means to produce a predetermined action, wherein said load device means draws D.C. current from said D.C. distribution system; and a ground system, said ground system including at least some metallic fittings on said boat that extend to an external surface of the boat for contacting said dockside water; said ground system being connected to respective ground leads associated with, said battery charger means, and said electrical load device means;

the improvement therein of a electrolysis inhibiting power management system which comprises in combination therewith:

a plurality of isolation switch means, each said isolation switch means being associated with a corresponding one of said docked boats; each said isolation switch means being connected in electrical series circuit between said on-boat a.c. electrical distribution system and said battery charger means input and on-board ground system of the associated boat, said isolation switch means having a plurality of inputs connected to said respective electrical leads of said on-boat a.c. distribution system and a plurality of outputs connected to the respective corresponding inputs of said battery charger means and said boat ground system, said switch means having a first state for interrupting a current conducting path between the respective inputs and outputs and an alternate a second state for completing a current conducting path between those respective inputs and outputs; and a plurality of control means, each said control means being associated with a corresponding one of said docked boats and a corresponding one of said isolation switch means, for controlling operation of said associated one of said isolation switch means, said control means for placing said isolation switch means in its second state, responsive at least to the occurrence of any of (a) a current demand by said stand-by electrical device means or (b) said battery voltage being below a predetermined minimum voltage level on the associated boat, whereby two of said a.c. electrical leads of said on-shore a.c. distribution system are connected, via said on-board a.c. distribution system, in operative relationship to said input of said battery charger means and said on-shore ground lead is connected to said boat ground system and said battery charger means produces D.C. current, and for restoring said isolation switch means to its first state to thereby interrupt said connections to the on-shore a.c. distribution system and ground, responsive to at least (a) an absence of demand for current by said stand-by electrical device and said D.C. output current supplied by said battery charger means being below a predetermined minimum level for a predetermined period of time and (b) said battery voltage on said associated boat being at or above said predetermined level; whereby said ground from said on-shore a.c. distribution system is connected to said boat ground system on said respective boat only for limited intervals during the period of time in which the boat is docked at the marina to thereby limit the duration of any corrosion causing ground currents transversing a path from the boat ground system, through the dockside water to or through other docked boats and said on-shore ground system.

9. The invention as defined in claim 8 wherein said isolation switch means is located on said boat marina.

10. The invention as defined in claim 8 wherein said isolation switch means is located on said boat.

11. The invention as defined in claim 8 further comprising: remote control means for coupling said control means to said isolation switch means.

12. The invention as defined in claim 11 wherein said remote control means further comprises any of an optical remote control means, an infra-red remote control means, a sonar remote control means, a current carrier type remote control means, and a radio remote control means.

13. An electrolysis inhibiting power management system for in-water resident boats comprising:

an a.c. distribution system for connection to an on-shore a.c. distribution system, said distribution systems including a hot lead, a neutral lead and a ground lead;

battery charger means having an input for connection to said a.c. distribution system for supplying current to a DC distribution system, said DC distribution system being connected to an electrical battery and to a DC standby electrical load;

a ground system on said boat, including at least one through-hull fitting for contact with said water, with said ground system being connected to a corresponding ground connection on each of said battery charger means and said DC standby electrical load;

control means for monitoring a plurality of electrical conditions said boat, said control means including:

first current sensor means for monitoring current supplied by said battery charger means;

second current sensor means for monitoring current supplied to said DC standby electrical load; and voltage sensor means for monitoring voltage of said electrical battery;

switching means coupled to said control means for connecting said ac distribution system to said input of said battery charger means, responsive to an output from said control means;

said control means being responsive to said sensor means for providing output to said switching means during the presence of predetermined sensed conditions, whereby said on-shore ac distribution system, including said ground lead, is connected via said on-board ac distribution system to said battery charger means and to said boat ground system only during the presence of said predetermined sensed conditions.

* * * * *